United States Patent [19]
Okubo et al.

[11] Patent Number: 5,586,434
[45] Date of Patent: Dec. 24, 1996

[54] ONE WAY CLUTCH MECHANISM FOR A TORQUE CONVERTER

[75] Inventors: Mamoru Okubo, Neyagawa; Koji Yoneyama, Shijyonawate, both of Japan

[73] Assignee: Exedy Corporation, Osaka, Japan

[21] Appl. No.: 520,795

[22] Filed: Aug. 30, 1995

[30] Foreign Application Priority Data

Sep. 13, 1994 [JP] Japan .................. 6-219233

[51] Int. Cl.$^6$ .................................. F16D 41/06
[52] U.S. Cl. ........................................ 60/345
[58] Field of Search ............... 60/345, 346; 29/889.5

[56] References Cited

U.S. PATENT DOCUMENTS

| | | | |
|---|---|---|---|
| 4,441,315 | 4/1984 | Bochot | 60/345 |
| 4,953,353 | 9/1990 | Lederman | 60/345 |
| 5,094,076 | 3/1992 | Henricks | 60/345 |
| 5,125,487 | 6/1992 | Hodge | 60/345 X |
| 5,215,173 | 6/1993 | Gimmler . | |

FOREIGN PATENT DOCUMENTS

3241053A1  5/1984  Germany .
4121586A1  1/1993  Germany .

OTHER PUBLICATIONS

German Journal Konstrucktion, 21 (1969) No. 5, pp. 184–190 (no translation available).

Primary Examiner—John E. Ryznic
Attorney, Agent, or Firm—Shinjyu Office of Patent Attorneys

[57] ABSTRACT

The invention relates to a stator having an inner race 24, a metal outer race 23, a stator carrier 21, a plurality of stator blades, and a one-way clutch 26. The one-way clutch 26 includes rollers 27, plate springs 28, and spring supporters 29. The rollers 27 are disposed in a plurality of clearance gaps defined between the inner and outer races becoming gradually larger in width in radial directions in a first circular direction. The plate springs 28 respectively urge the rollers 27 in the first circular directions. The spring supporters 29 are molded integrally with the stator carrier 21 so as to be fixed in an inner circumferential wall of the outer race 23 and support the plate springs 28.

3 Claims, 3 Drawing Sheets

ONE WAY CLUTCH MECHANISM FOR A TORQUE CONVERTER

BACKGROUND OF THE INVENTION

A) Field of the Invention

The present invention relates to a one way clutch mechanism employed in a stator assembly of a torque converter. The invention further relates to a method of manufacturing the stator having the one way clutch mechanism.

B) Description of Related Art

Torque converters are commonly used to transmit torque from an engine to a transmission in an automobile. A typical torque converter generally includes three main components, an impeller, a turbine and a stator all disposed within a torque converter housing. The torque converter housing is usually filled with hydraulic fluid. In such a torque converter, the stator or a wheel stator assembly is functionally disposed between the impeller and the turbine. The wheel stator assembly includes a ring-shaped stator carrier, a plurality of stator blades provided on an outer circumferential surface of the stator carrier, an outer race fixed to the stator carrier at its inner circumferential portion, an inner race placed close to an inner circumferential portion of the outer race and a one-way clutch placed between the inner and outer races. Typically, the stator assembly engages a stator shaft fixed to the transmission so as not to rotate relative to the transmission.

The one-way clutch employed in the clutch includes a plurality of rollers and a plurality of elastic elements for urging the rollers in a first circular direction. The elastic elements are supported by projections provided on an inner circumferential surface of the outer race. The projections are formed integral with the outer race or may be made of separate components. Friction surfaces are formed in the inner circumferential surface of the outer race corresponding to the positions where the rollers are disposed. In combination with the outer circumferential surface of the inner race, the friction surfaces define a plurality of clearance gaps which become greater in radial width toward the first circular directions.

In this one-way clutch, when force is applied to the outer race in the first circular directions, the rollers are urged toward narrower portions of the clearance gaps in their radial widths and are frictionally engaged with the inner race. Hence, the outer race and the stator carrier cannot rotate relative to the inner race, and torque transmission can be performed between them. Under this condition, the elastic elements urge the rollers in the first circular direction. When force is applied to the outer race in a second circular direction to rotate it, the rollers compress the elastic elements and move them toward larger portions of the clearance gaps in their radial widths, so that the rollers can be released from frictional engagement. Consequently, the outer race rotates relative to the inner race, and the torque transmission between them is discontinued.

In the conventional wheel stator assembly as described above, the process of forming the projections integral with the outer race at its inner circumferential portion is a complicated one and can cause an increase in fabrication costs. In a configuration where the projections are formed separate components with the outer race, the separate components must be prepared independently, then rate process, which also leads to an increase in the fabrication cost.

SUMMARY OF THE INVENTION

Accordingly, it is an object of the present invention to reduce a cost of fabricating a wheel stator assembly.

In one embodiment of the present invention, a torque converter assembly includes a stator assembly having an inner race and a metal outer race. The metal outer race includes a plurality of friction surfaces formed on an inner circumferential portion. The distance between a first point of each of the friction surfaces is closer to an outer surface of the inner race than the distance between a second point of each of the friction surfaces from the outer surface of the inner race. A ring-shaped resin stator carrier is molded about at least an outer circumference of the outer race to be integral therewith, the ring-shaped resin stator carrier formed with a plurality of supporting elements, the supporting elements extending axially between the inner race and the outer race. A one-way clutch mechanism is defined between the inner and outer races and includes: a plurality of rolling elements disposed between the inner race and the outer race, one of the rolling elements disposed between each pair of adjacent ones of the supporting elements; and a plurality elastic elements, one elastic element disposed adjacent to each of the supporting elements for urging the rolling elements in a first circular direction.

In an alternate embodiment, the metal outer race is formed with a plurality of concave portions, one concave portion formed between adjacent ones of the friction surfaces. Further, the plurality of resin supporting elements are molded integral with the stator carrier so as to be fixed in the concave portions of the outer race.

The invention further includes a method of manufacturing the stator carrier. The method includes the steps of:

providing an outer race member with a plurality of cirumferentially inclined surfaces and a plurality of concave portions, one concave portion formed between each pair of adjacent inclined surfaces;

positioning a mold concentrically within the outer race, the mold formed with a plurality of inclined surfaces corresponding to the inclined surfaces on the outer race;

rotating the mold relative to the outer race bringing the inclined surfaces on the mold into engagement with the inclined surfaces on the outer race; and injecting resin into spaces defined between the mold and the outer race forming protruding members therebetween and further forming a stator carrier around the outer periphery of the outer race.

In the stator assembly according to the present invention, the supporting elements supporting the elastic elements of the one-way clutch mechanism are resin elements molded integral with the stator carrier. Since the supporting elements are molded simultaneous with the stator carrier, the assembly process is simplified and extra components are unnecessary, as compared with the prior art. As a result, fabrication costs are reduced.

These and other objects, features, aspects and advantages of the present invention will become more fully apparent from the following detailed description of the present invention when taken in conjunction with the accompanying drawings where like reference numerals denote corresponding parts throughout, in which:

DETAILED DESCRIPTION OF THE PREFERRED EMBODIMENT

Embodiment 1

Figure 1:
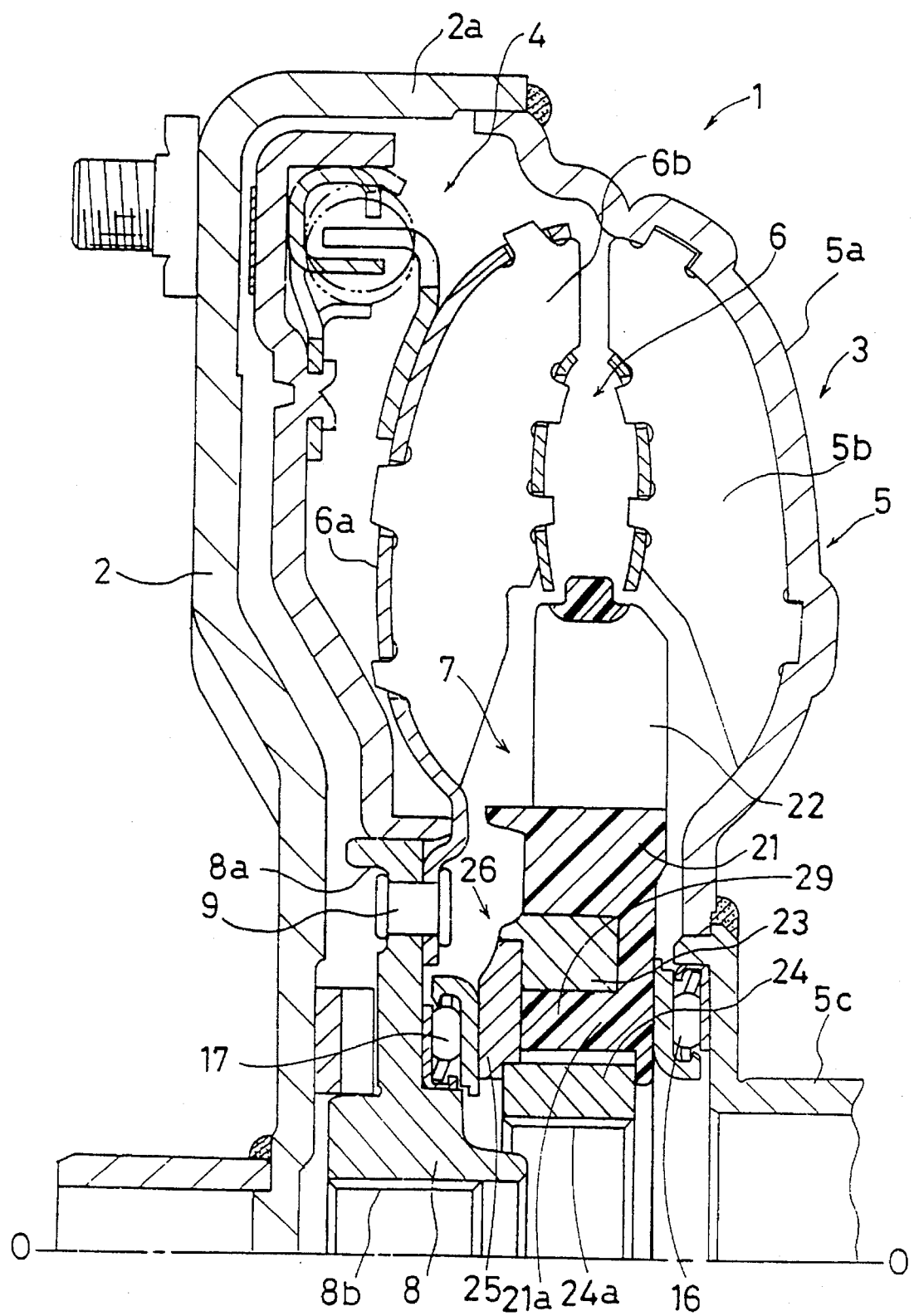
FIG. 1 is a fragmentary, side section showing a torque converter having a one way clutch mechanism in accordance with one embodiment of the present invention.

FIG. 1 depicts a torque converter 1 in accordance with a first embodiment of the present invention. The line O—O represents a rotation axis of the torque converter 1.

The torque converter 1 has a front cover 2 that is attachable to, for instance, a flywheel or flexplate that is fixed to the crankshaft of an engine. An impeller shell 5a is fixed to an outer circumferential wall 2a of the front cover 2. The front cover 2 and the impeller shell 5a together define a hydraulic oil chamber. Inside the hydraulic chamber a torque converter main body 3 is disposed. The torque converter main body 3 includes three fluid reacting members and a lock-up device 4.

The torque converter main body 3 includes an impeller 5, a turbine 6, and a stator (wheel stator assembly) 7. An impeller blade 5b is fixed inside the impeller shell 5a. The impeller shell 5a has its inner circumferential end fixed to an impeller hub 5c. The turbine 6 is placed within the hydraulic oil chamber so as to face the impeller 5. The turbine 6 includes a turbine shell 6a and a plurality of turbine blades 6b fixed to the turbine shell 6a. The turbine shell 6a has its inner circumferential end fixed to a flange 8a of a turbine hub 8 by rivets 9. In an inner circumference of the turbine hub 8, a spline hole 8b is formed and it is configured to be coupled to a main drive shaft (not shown) extending from the transmission.

The stator 7 is placed radially inward from the impeller 5 and the turbine 6 and includes a ring-shaped stator carrier 21, a stator blade 22, an outer race 23, an inner race 24, a retainer 25, and a one-way clutch 26.

The stator carrier 21 the stator blade 22 and a plurality of spring supporters 29 are integrally formed being made of resin, and integrated with the outer race 23 by means of insert molding.

The outer race 23 is a ring-shaped metal element fixed at an inner circumferential portion of the stator carrier 21. The inner race 24 is a ring-shaped element disposed spaced apart from an inner circumferential portion of the outer race 23 and is provided in its inner circumference with a spline hole 24a. The spline hole 24a is configured to be contactable with a stator shaft (not shown) fixed to a transmission housing so that the inner race 23 does not rotate with respect to the transmission and stator shaft (not shown).

Sides of the outer race 23 and the inner race 24 on the right of FIG. 1 are supported by a receptacle 21a defined the stator carrier 21. The receptacle 21a of the stator carrier 21 is supported by the impeller hub 5c via a thrust bearing 16. Ends of the outer race 23 and the inner race 24 on the left of FIG. 1, respectively, contact the retainer 25, and the retainer 25 is supported by the turbine hub 8 via a thrust bearing 17. The stator 7 is retained in position in axial directions between the impeller hub 5c and the turbine hub 8 by the thrust bearings 16 and 17.

Figure 2:
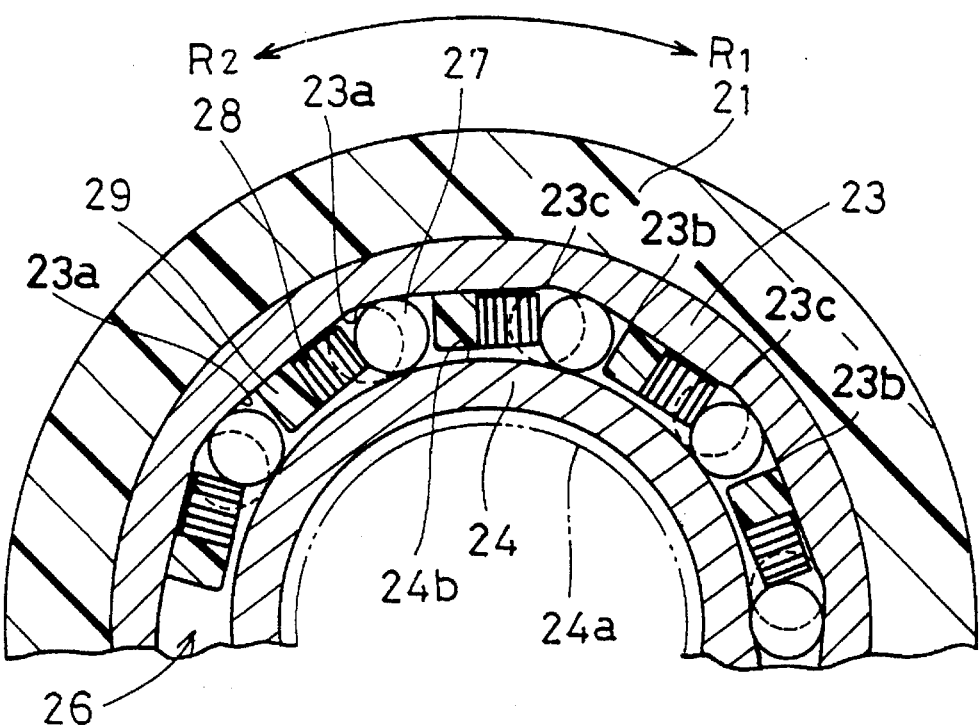
FIG. 2 is a fragmentary front view of the one way clutch mechanism depicted in FIG. 1, shown with portions of the torque converter removed for clarity.

As is shown in FIG. 2, the one-way clutch 26 is a mechanism for permitting the stator 7 to rotate relative to the inner race 24 only in a first circular direction. The one-way clutch 26 includes a plurality of components disposed in a space between the outer race 23 and the inner race 24. Elements constituting the one-way clutch 26 include rollers 27 extending in axial directions, plate springs 28, and spring supporters 29, a single unit thereof having one roller 27, one plate spring 28 in contact with one spring supporter 29, as illustrated in FIG. 2.

The inner circumferential surfaces of the outer race 23 are provided with friction surfaces 23a. The rollers 27 are disposed proximate to the friction surfaces 23a. The friction surfaces 23a are radially inclined such that they extend gradually radially outwardly in the first circular direction R1. In other words, the distance between the surface 23a and an outer surface 24b of the inner race 24 is greater at a point 23c than it is at a point 23b.

The plate springs 28 urge the rollers 27 in a second circular direction R2. The spring supporters 29 are made of resin and molded integral with the stator carrier 21 and support the plate springs 28. A plurality of one-way clutch units, each unit having one roller 27, one plate spring 28 and one spring supporter 29, are arranged annularly to define the one-way clutch 26.

With reference again to FIG. 1, the lock-up device 4 is placed in a space between the front cover 2 and the turbine shell 6a. A power input piston of the lock-up device 4 can be engaged and disengaged to and from a friction surface of the front cover 2 while its power output element is fixed to a back of the turbine shell 6a.

An operation of this embodiment will now be described.

When the front cover 2 rotates because of rotation of the engine (not shown), the impeller 5 accordingly rotates and as the impeller 5 rotates it moves hydraulic fluid. The torque is transmitted to the turbine 6 by movement of hydraulic oil. The torque from the turbine 6 is transmitted to a main drive shaft (not shown) of the transmission via the turbine hub 8.

When the turbine 6 rotates at low velocity, the hydraulic oil flowing from the turbine 6 collides with a concave surface of the stator blade 22 to urging the blade 22 and the outer race 23 to rotate in the second circular direction R2. Simultaneously, the roller 27 frictionally engages the friction surface 23a of the outer race 23 and the outer circumferential surface 24b of the inner race 24 so as to restrict relative rotation between the inner race 24 and the outer race 23, as is shown in FIG. 2 in solid lines. Hence, the stator carrier 21 and the outer race 23 cannot rotate relative to the inner race 24. This causes the hydraulic oil fed back to the impeller 5 to flow in a direction of rotation of the impeller blade 5b of the impeller. As a result, the torque of the turbine 6 is increased.

As the number of revolutions gradually come close to the number of revolutions of the impeller 5, the hydraulic oil from the turbine 6 collides with a convex surface of the stator blade 22, and urges the outer race 23 to rotate in the first circular direction R1. As a consequence, the rollers 27 roll toward the second circular direction R2, compressing the plate springs 28, until they reach positions shown in FIG. 2 by broken lines. Since spaces between the friction surface 23a and the outer circumferential surface 24b of the inner race 24 are larger at the point 23c than at the point 23b, the rollers 27 are not frictionally engaged between the outer race 23 and the inner race 24. Thus, the outer race 23 and the stator carrier 21 may continuously rotate in the first circular direction R1 relative to the inner race 24. As the stator blade 22 continuously rotates toward in the direction R1, the hydraulic oil fed back to the impeller 5 receives no strong resistance, and the efficiency of torque transmission is enhanced.

In the above-mentioned configuration, the spring supporters 29 are molded integrally with the stator carrier 21 and the stator blade 22, and the fabrication of the assembly is facilitated. The friction surface 23a is formed with a slight slant at the inner circumferential portion of the outer race 23, and there is no need of a complicated configuration as in the prior art. There is also no need of providing extra components for forming the supporting elements. All these bring about a reduction in the fabrication cost.

Embodiment 2

Figure 3:
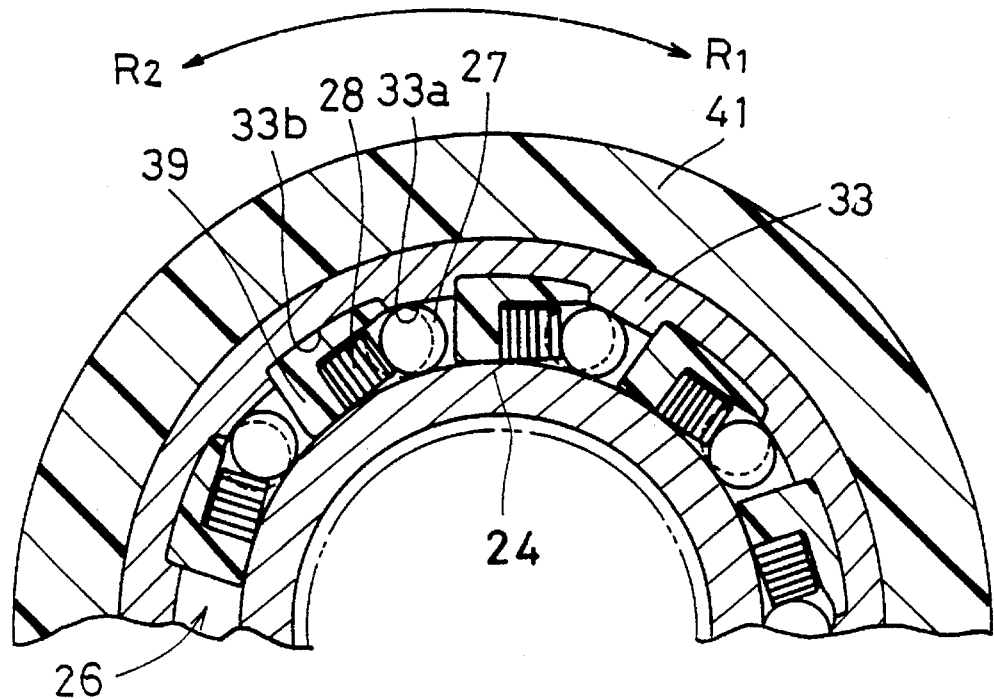
FIG. 3 is a fragmentary front view similar to FIG. 2, showing a one way clutch mechanism in accordance with an alternate embodiment of the present invention.

In an alternate embodiment shown in FIG. 3, a stator includes a stator carrier 41, an outer race 33 and an inner race 24. The outer race 33 is formed with concave portions 33b greater in inner diameter than friction surfaces 33a formed between adjacent ones of the friction surfaces 33a of the outer race 33. Spring supporters 39 are accommodated in the concave portions 33b, protruding inward in axial directions.

A method of fabricating a wheel stator element (an integrated element consisting of a stator carrier 41, a stator blade, an outer race 33 and the spring supporters 39) of a stator 7 in this embodiment will be described below.

Figure 4:
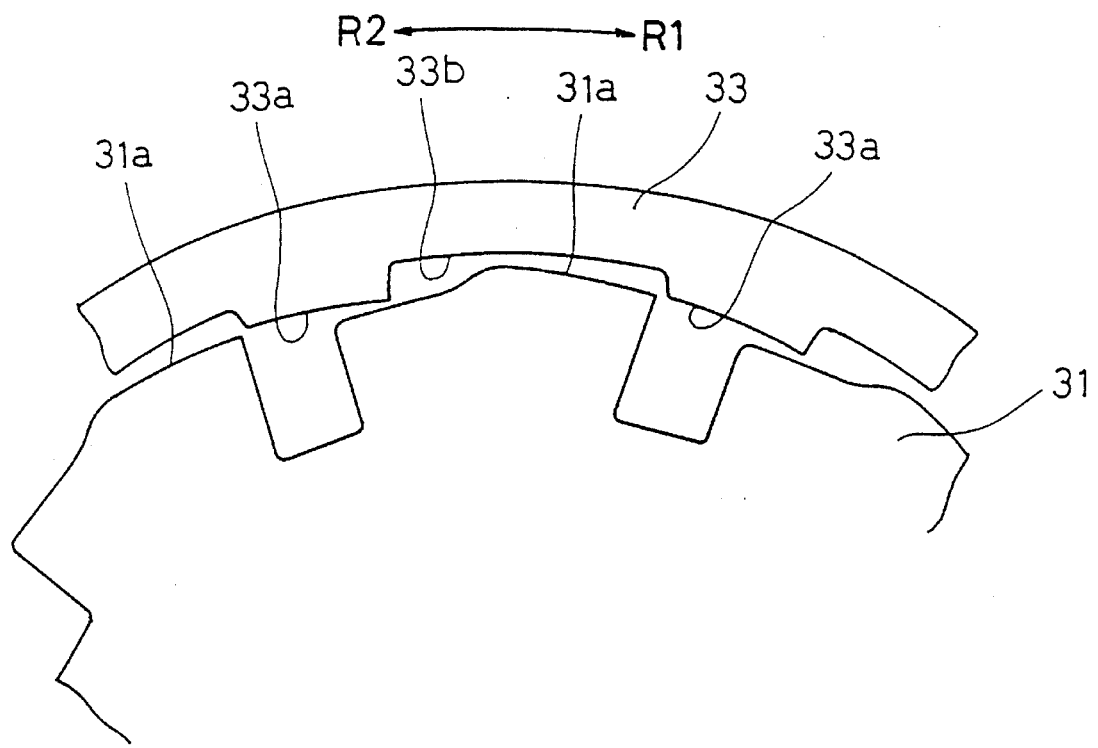
FIG. 4 is a schematic front view illustrating a step of a manufacturing method of for forming a portion of the one way clutch mechanism.
Figure 5:
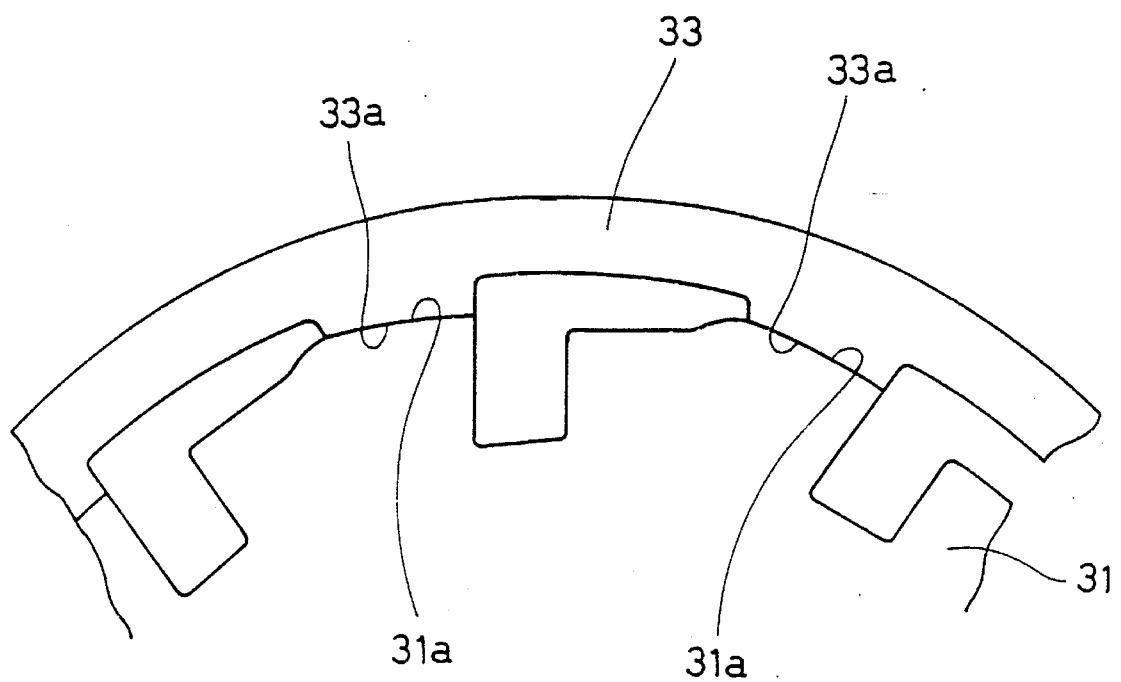
FIG. 5 is another schematic front view, similar to FIG. 4, illustrating another step of a manufacturing method of for forming a portion of the one way clutch mechanism.

As shown in FIG. 4, a mold 31 for resin molding is put in a specified position related to the outer race 33. Contact surfaces 31a of the mold 31 are shaped so as to be in contact with the friction surfaces 33a of the outer race 33 and are put in the concave portions 33b of the outer race 33. Now the mold 31 is rotated toward the second direction R2 relative to the outer race 33. The contact surfaces 31a of the mold 31 come tightly in contact with the friction surfaces 33a of the outer race 33 to be a state shown in FIG. 5. Next, the mold 31 is filled with resin material to perform insert molding. The stator carrier 41, the spring supporters 39, and the stator blades are all formed at the same time (the mold for the stator blades and the stator carrier 41 are not shown). Since the friction surfaces 33a are tightly in contact with the contact surfaces 31a, it is unlikely that resin will adhere to the friction surfaces 33a. Last, the mold 31 is removed.

The above-mentioned effect is attained by setting the contact surfaces 31a of the mold 31 in position within the concave portions 33b of the outer race 33. Specifically, since the friction surfaces 33a are not circular in shape, it is difficult to bring the contact surfaces 31a in tight contact with the friction surfaces 33a without the concave portions 33b.

In the fabrication method as has been described, the spring supporters 39 are molded integral with the stator carrier 41 and the stator blade, and thus, the fabrication is facilitated. The friction surface 33a are formed with a slight slant and the concave portions 33b at the inner circumferential portion of the outer race. Hence, there is no need for complicated processing as in the assembly and manufacturing of prior art configurations. There is also no need of providing extra components for forming the supporting elements. All these bring about a reduction of a fabrication cost.

In a wheel stator assembly of a torque converter according to the present invention, supporters for supporting elastic elements of a one-way clutch mechanism are resin supporters molded integral with a stator carrier. Since the supporters are molded in the same process step with the stator carrier, processing an outer race is unnecessary, and also allows for a possible reduction in overall parts and components. This brings about a reduction in a fabrication cost.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. A stator assembly for a torque converter assembly, comprising:

an inner race;

a metal outer race having a plurality of friction surfaces formed on an inner circumferential portion, a distance between a first point of each of said friction surfaces and an outer surface of said inner race being smaller than the distance between a second point of each of said friction surfaces and said outer surface of said inner race;

a ring-shaped resin stator carrier molded about at least an outer circumference of said outer race to be integral therewith, said ring-shaped resin stator carrier formed with a plurality of supporting elements, said supporting elements extending axially between said inner race and said outer race;

a one-way clutch mechanism including a plurality of rolling elements disposed between said inner race and said outer race, one of said rolling elements disposed between each pair of adjacent ones of said supporting elements, a plurality elastic elements, one elastic element disposed adjacent to each of said supporting elements for urging said rolling elements in a first circular direction.

2. A stator assembly as set forth in claim 1 wherein said metal outer race is formed with a plurality of concave portions, one concave portion formed between adjacent ones of said friction surfaces; and said plurality of resin supporting elements being molded integral with said stator carrier so as to be fixed in said concave portions of said outer race.

3. A method of manufacturing a stator carrier having a one way clutch mechanism for a torque converter, comprising;

providing an outer race member with a plurality of cirumferentially inclined surfaces and a plurality of concave portions, one concave portion formed between each pair of adjacent inclined surfaces;

positioning a mold concentrically within the outer race, the mold formed with a plurality of inclined surfaces corresponding to the inclined surfaces on the outer race;

rotating the mold relative to the outer race bringing the inclined surfaces on the mold into engagement with the inclined surfaces on the outer race; and injecting resin into spaces defined between the mold and the outer race forming protruding members therebetween and further forming a stator carrier around the outer periphery of the outer race.

\* \* \* \* \*